US005565914A

United States Patent [19]
Motta

[11] Patent Number: 5,565,914
[45] Date of Patent: Oct. 15, 1996

[54] DETECTOR WITH A NON-UNIFORM SPATIAL SENSITIVITY

[76] Inventor: Ricardo J. Motta, 125 Eldora Dr., Mountain View, Calif. 94041

[21] Appl. No.: 423,440

[22] Filed: Apr. 18, 1995

Related U.S. Application Data

[63] Continuation of Ser. No. 225,034, Apr. 8, 1994, abandoned.
[51] Int. Cl.$^6$ .............................. H04N 3/14; H04N 5/335
[52] U.S. Cl. .................. 348/294; 348/219; 250/363.06; 382/278
[58] Field of Search ..................... 348/294, 219; 382/278; 250/363.06; H04N 5/335, 3/14

[56] References Cited

U.S. PATENT DOCUMENTS

| | | | |
|---|---|---|---|
| 3,700,895 | 10/1972 | Dicke | 378/2 |
| 3,748,470 | 7/1973 | Barrett | 250/263 |
| 4,209,780 | 1/1980 | Fenimore et al. | 340/146.3 |
| 4,998,164 | 3/1991 | Endo et al. | 358/44 |

OTHER PUBLICATIONS

Coggins, A Multiscale Description of Image Structures for Segmentation of Biomedical Images; IEEE 1990, TH0311.

*Primary Examiner*—Wendy Greening
*Assistant Examiner*—Andrew B. Christensen

[57] ABSTRACT

A detector with a non-uniform spatial sensitivity measuring an image. From the measured outputs, the image can be re-constructed by a signal processing scheme. In a preferred embodiment, an array of such detectors, each with an imaging surface and a non-uniform spatial sensitivity across the surface, is used to measure the image. In another preferred embodiment, the detector(s) measures the image more than once, each time with the relative position between the image and the detector(s) changed. The measured outputs are interlaced together and deconvolved by an inverted model of the detector(s) to re-construct the image.

19 Claims, 11 Drawing Sheets

DETECTOR WITH A NON-UNIFORM SPATIAL SENSITIVITY

CROSS-REFERENCE TO RELATED APPLICATION(S)

This is a continuation of application Ser. No. 08/225,034 filed on Apr. 8, 1994, now abandoned.

BACKGROUND OF THE INVENTION

The present invention relates generally to sensors and more particularly to a sensor with a non-uniform spatial sensitivity.

There is a constant need to improve the performance of digital cameras. A typical digital camera has an array of charge coupled devices (CCD), which occupies an area A at the image plane of the camera to capture an image. As shown in FIG. 1, the array is typically made up of many detectors arranged in a grid with a period T, and with each detector occupying an area having a dimension r. The array is exposed for a time t to capture the image. If T is equal to r, the resolution of the captured image would depend on T. In many situations, r is smaller than T, and the array is translated during the image capturing stage to obtain a higher resolution image. In those circumstances, the resolution of the captured image depends on r—the smaller the r, the higher the resolution.

In order to use a detector with a small r, one typically either needs many more detectors to fill up the Area A at the image plane, or to step the array at a high resolution in both the X and the Y directions to capture information in the entire image. Unfortunately, both methods have their weaknesses. In the first method, as the number of detectors increases, the price of the array goes up dramatically. In the second method, with the stepping at a high resolution, one needs to have many more steps to cover the entire image. Since the image is captured in time t, the more steps the array takes to capture the image, the less time the array has for each step. Thus, as the number of steps increases, the array gathers less light for each step, which translates to an array with a low sensitivity. For example, replacing a first 1,024×1,024 CCD with a second 512×512 CCD in the area A of the image plane could reduce the sensitivity by sixteen times. This is because the second CCD occupies about ¼ of the area and is exposed about ¼ of the time as compared to the first CCD.

It should be apparent from the foregoing that there is still a need to capture images with an inexpensive detector array that has good resolution and sensitivity.

SUMMARY OF THE INVENTION

The present invention provides an inexpensive detector array with very good resolution. To achieve good resolution, many prior art arrays either have large number of small detectors or have to step small detectors at a high resolution. The first option using large number of small detectors significantly increases the cost of the arrays. The second option of stepping with small detectors significantly decreases the sensitivity of the arrays. The present invention combines a detector with a non-uniform spatial sensitivity and a signal processing scheme to measure and re-construct high resolution images. With the present invention, one does not need to increase significantly the cost of the array, nor does one need to decrease significantly the sensitivity of the array.

The present invention includes a detector with a photosensitive surface to measure an image. The detector has a non-uniform spatial sensitivity across the surface. From the measured outputs, the image can be re-constructed by a signal processing scheme.

In one embodiment, the photosensitive surface has at least two edges. The sensitivity of the detector is substantially highest at the intersection of the two edges and decreases monotonically from its highest value to almost negligible sensitivity in some parts of the surface. In another preferred embodiment of the invention, there is an array of the above detectors arranged on an image plane.

In most operations for the present invention, the detector or the array of detectors measure the image more than once, each time with the relative position between the image and the detector, or between the image and the array changed.

Due to the non-uniformity of the sensitivity in the present invention, the size of the detector does not have to be very small for high resolution imaging. Depending on the resolution desired, one sets the size of each step the detectors have to take in measuring the image. The image is re-constructed by first generating a model that represents the non-uniform spatial sensitivity of the detectors. Then the model is inverted analytically. Finally, the inverted model deconvolves the measured outputs to re-construct the image.

The total sensitivity of a detector is related to the integral of the sensitivity across the area of the detector. Prior arts detectors increase the imaging resolution by scaling down the size of the detectors, which may significantly reduce the amount of light captured and the sensitivity of the detectors. In the present invention, due to the sensitivity profile of each detector, the resolution of the re-constructed image can be very high, without the need of scaling down the size of the detector.

Other aspects and advantages of the present invention will become apparent from the following detailed description, which, when taken in conjunction with the accompanying drawings, illustrates by way of example the principles of the invention.

Same numerals in FIGS. 1–9 are assigned to similar elements in all the figures. Embodiments of the invention are discussed below with reference to FIGS. 1–9. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
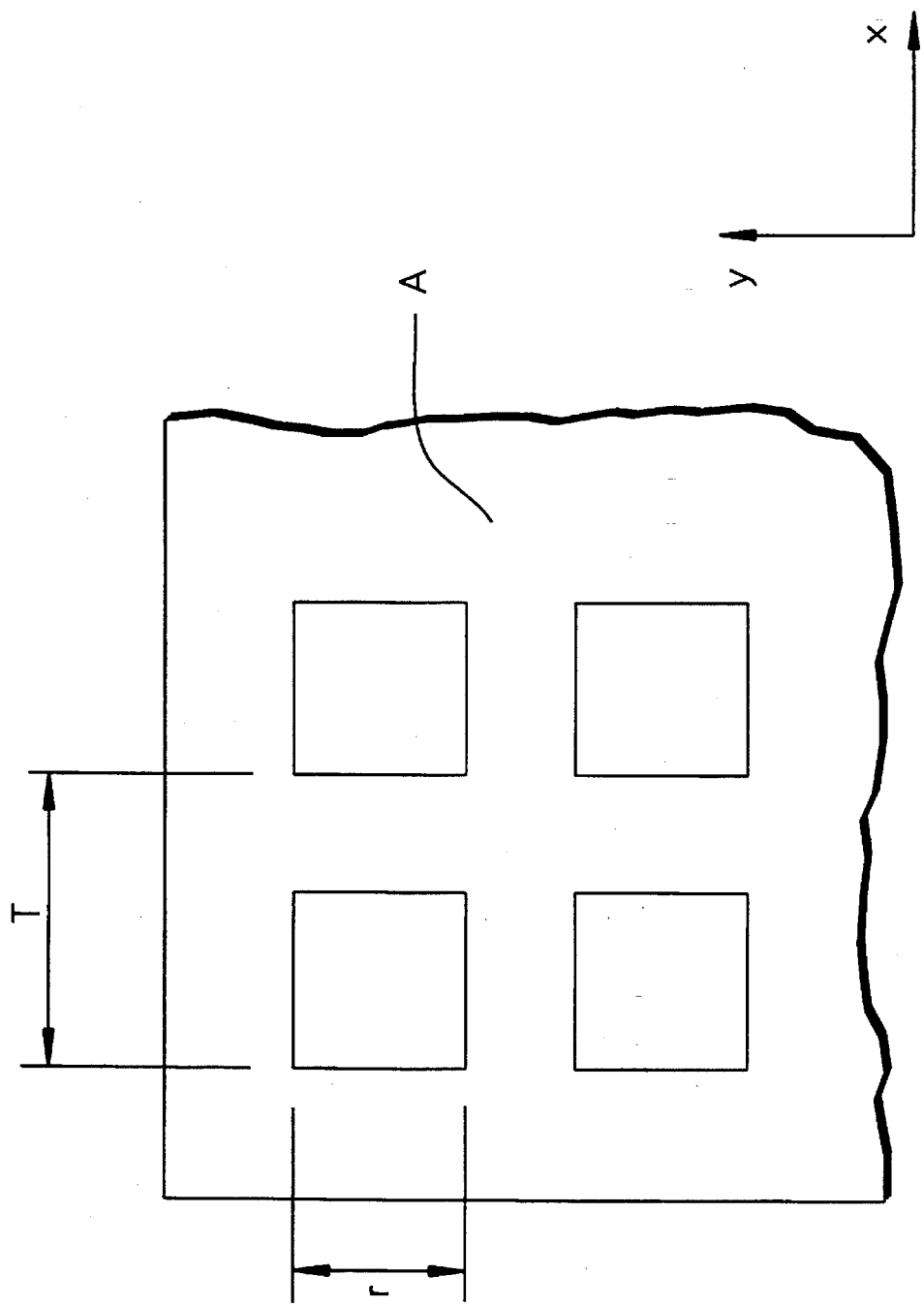
FIG. 1 shows a part of a prior art detector array.
Figure 2A:
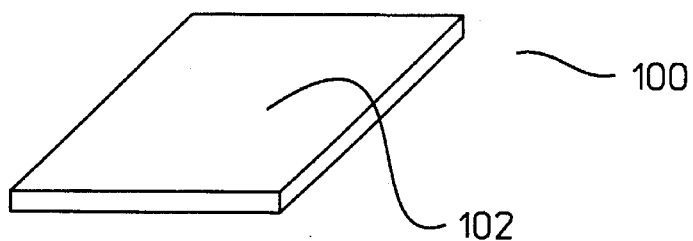
FIG. 2A shows the first preferred detector of the present invention.

FIG. 2A shows the first preferred detector 100 of the present invention. The detector 100 has a photosensitive surface 102 for measuring the light intensity from an image, or in short for measuring the image; and the detector is preferably made of a photosensitive material. The surface 102 is rectangular in shape in the present embodiment; in other embodiments, the surface may be of other shapes, such as a quadrant.

Figure 2B:
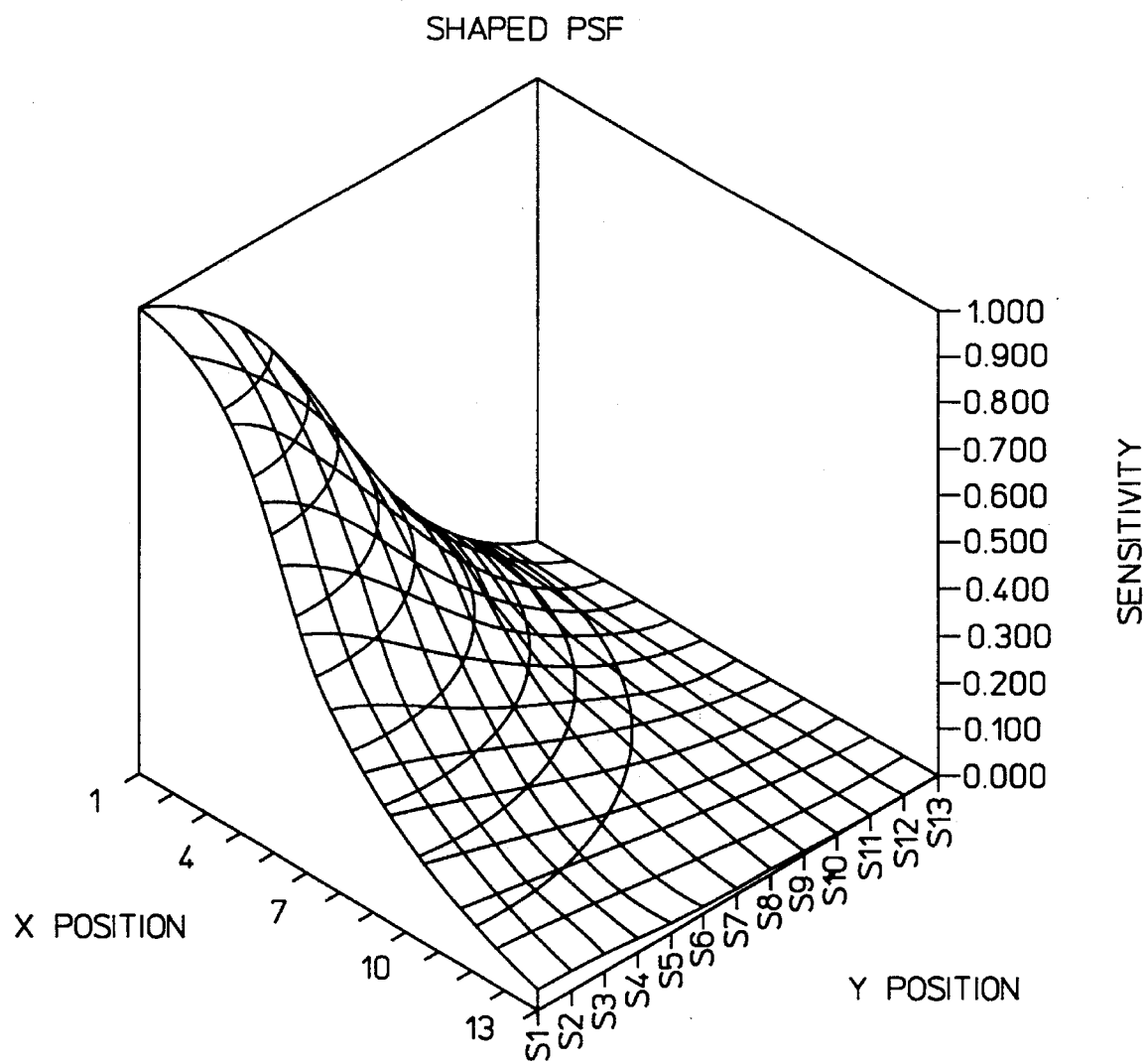
FIG. 2B shows the sensitivity across the photosensitive surface of the preferred detector in FIG. 2A.

FIG. 2B shows the non-uniform spatial sensitivity 108 across the photosensitive surface 102 of the preferred detector 100. The surface 102 is bounded by four edges, 112, 114, 116 and 118. The sensitivity 108 of the detector 100 is substantially highest at the intersection 120 of two of the edges, namely 112 and 118, and decreases monotonically from its highest value to almost negligible sensitivity in some regions on the surface, such as in the region 122.

In the first preferred detector, the sensitivity decreases smoothly, substantially without any discontinuities, such as in an exponential manner. Ideally, the spatial derivatives with all their higher derivatives of the sensitivity should preferably not be zero at any point on the photosensitive surface 102 except at the two edges, 112 and 118. However, the invention is not limited to smooth descent in sensitivity. In another preferred embodiment, the sensitivity decreases in small steps across the photosensitive surface 102.

In the first preferred detector, the integral of the sensitivity across the photosensitive surface 102 of the detector 100 is about 25% of the total sensitivity of a detector, with the highest sensitivity uniformly across the entire surface. This implies that the preferred detector captures about 25% of the light as compared to the detector with the highest sensitivity uniformly distributed across the photosensitive surface. However, the first preferred detector with the non-uniform spatial sensitivity can lead to very high image resolution.

In another preferred embodiment, the detector is similar to a line detector, with its sensitivity highest along one edge of the detector and decreasing monotonically from the edge to almost negligible sensitivity on some portions of the photosensitive surface. Such a detector is especially suitable for one dimensional imaging.

Figure 3:
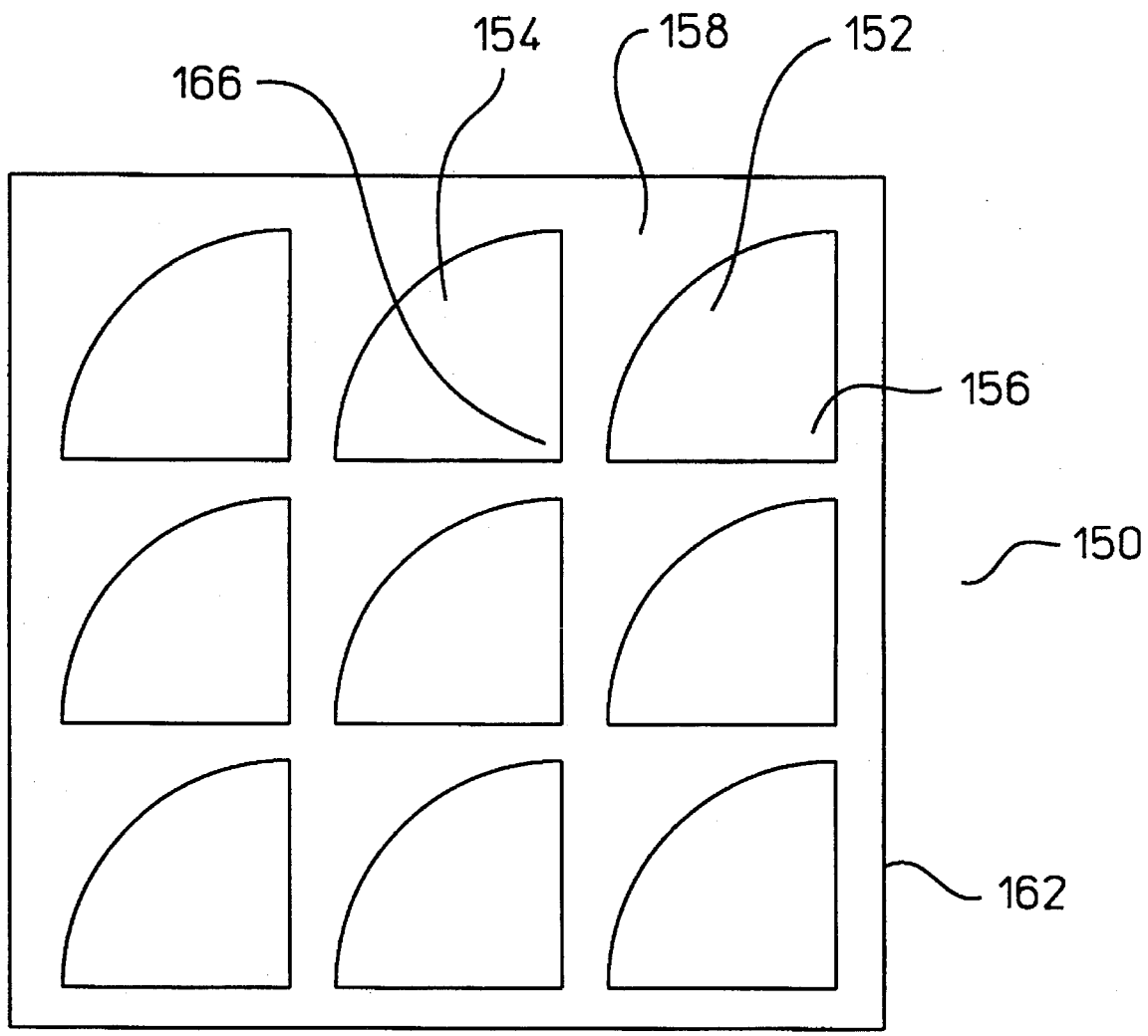
FIG. 3 shows a part of a second preferred embodiment of the present invention.

FIG. 3 shows a part of a second preferred embodiment of the present invention with an array 150 of detectors, all similar to the preferred detector 100. Each detector, such as 152, has a sensitivity that is highest at the intersection, such as 156, of two edges of the detector and monotonically decreases from that point to negligible sensitivity, such as at the location 158. The detectors are preferably arranged in a rectangular grid to form a two dimensional array on an image plane 162. In one preferred embodiment, the array is an array of charge coupled devices.

In the preferred embodiment shown, the detectors are aligned such that the sensitivities of all the detectors are in similar orientations. For example, the highest sensitivity of the detector 152 is at the region 156, and the highest sensitivity of the detector 154 is at the region 166.

The preferred detector or the preferred array of detectors measures the image, with their measured outputs for reconstructing the image by a signal processing scheme. Usually the measurement involves stepping the detector(s) across the image.

Figure 4:
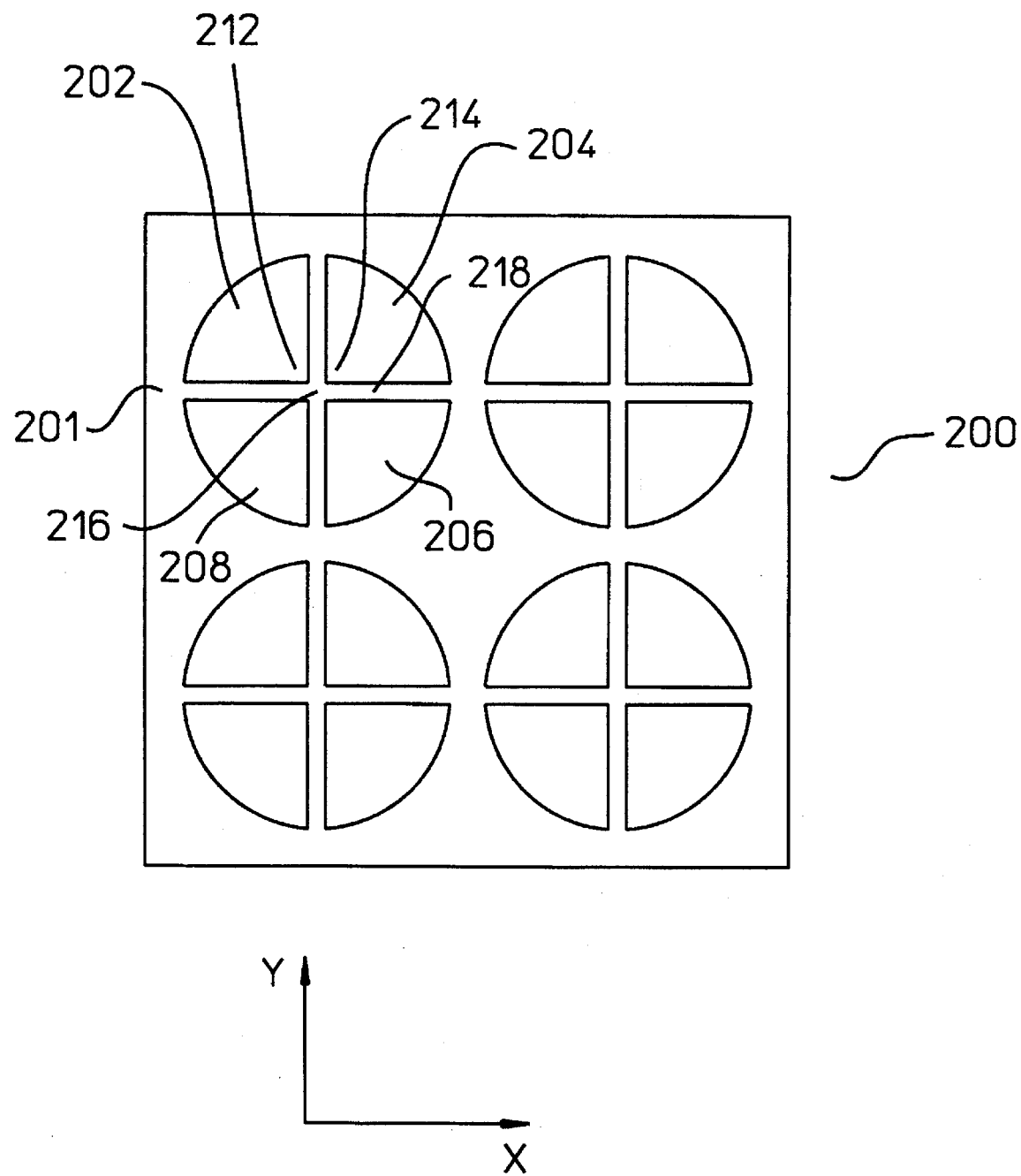
FIG. 4 shows a part of a third preferred embodiment of the present invention.

FIG. 4 shows a part of a third preferred embodiment 200 of the present invention. In this embodiment, all the detectors are not aligned along one orientation. The detectors are arranged with four detectors as a unit 216. For each unit, such as 202, 204, 206 and 208, the detectors form a substantially circularly-symmetric sensitivity profile. For example, the highest sensitivity point for detector 202 is at 212; and the highest sensitivity point for detector 204 is at 214. The point 212 and the point 214 are approximately at the center 216 of the unit 201. From the center 216, the sensitivity decreases monotonically in an approximately circularly symmetric fashion. The outputs of the detectors again are used to re-construct the image by the signal processing scheme, except that the outputs of some of the detectors, such as the detector 204, are mirror-imaged about the Y axis before the outputs are analyzed.

Figure 5:
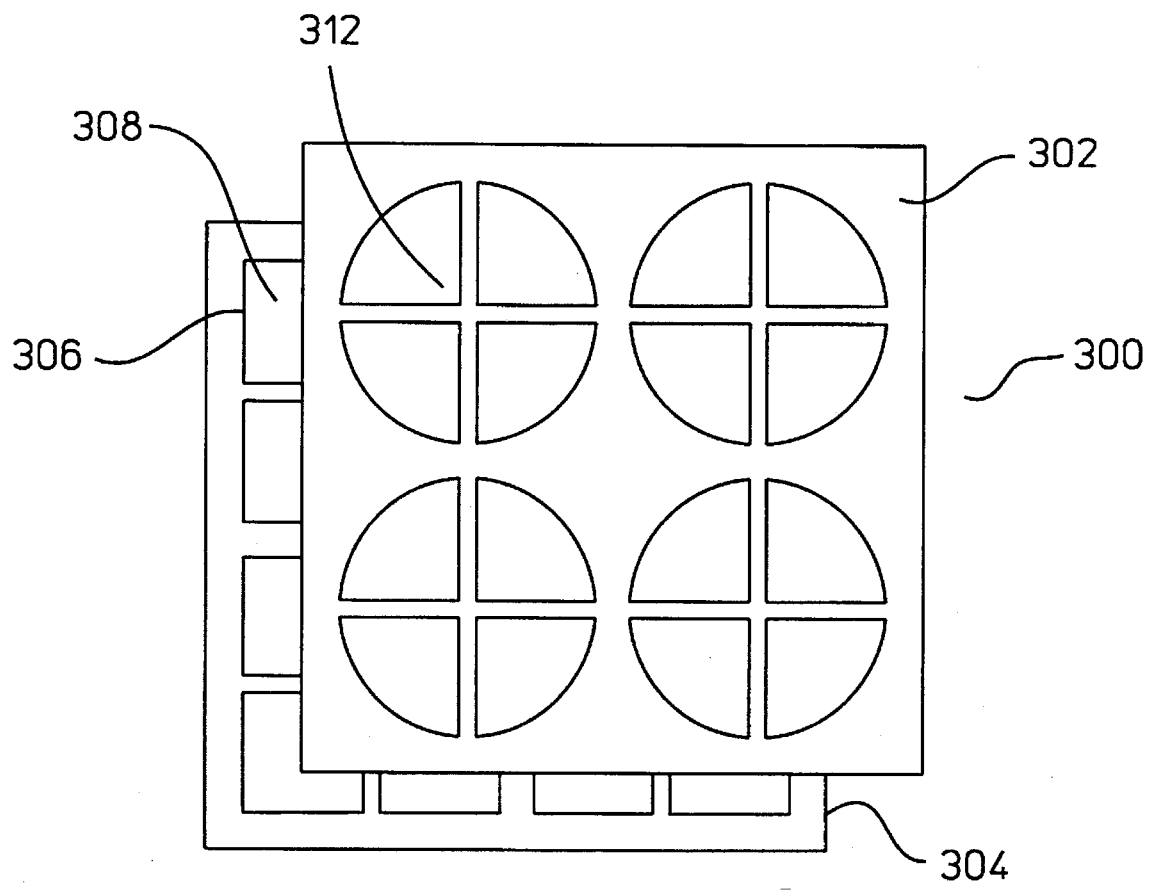
FIG. 5 shows a part of a fourth preferred embodiment of the present invention.

Different methods can be used to manufacture the preferred embodiments. FIG. 5 shows a part of a fourth preferred embodiment 300, which also represents a way to generate the third preferred embodiment 200. The array of detectors 300 includes a film or a mask 302 on top of an array of sensors 304. Each sensor has uniform sensitivity across its photosensitive surface; for example, the sensor 306 has uniform sensitivity across its photosensitive surface 308. The mask on top of each detector has an optical-transmittance profile that substantially follows the non-uniformity of the sensitivity of its corresponding detector; for example, the part 312 of the mask 302 on top of the sensor 308 has a very high transmittance which is similar to the high sensitivity at the location 212 of the detector 202 in FIG. 4.

Another way to manufacture, for example, the third embodiment shown in FIG. 4, is to heavily dope the detector at the region 216 and then heat it for a controlled amount of time so that the dopant diffuses away from the region 216. The heat treatment should be well controlled and should not be for too long, or else the sensitivity of the detector might lose its non-uniformity. After the process of heat treatment, some parts of the unit 201, such as the region 216, are modified by another step to significantly reduce their sensitivity. This other step can be achieved by forming grooves in the shape of a cross 218 to fabricate the four detectors in the unit 201; with the grooves, some of the detector materials with their dopants are removed to isolate the detectors.

A third way to manufacture the present invention is to dope the detectors selectively, different doping concentration at different locations on the photosensitive surfaces.

Figure 6:
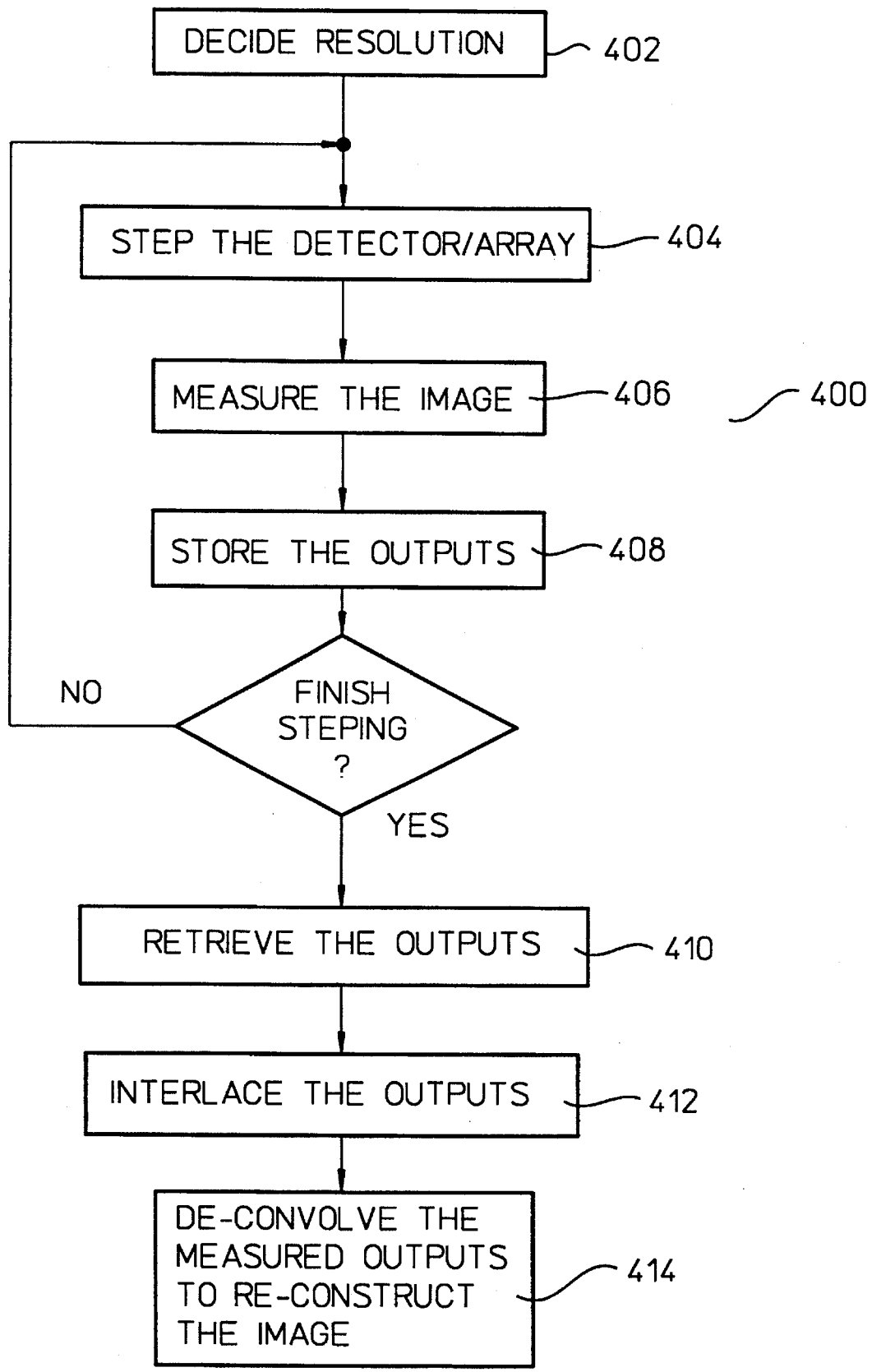
FIG. 6 shows a preferred method to use the present invention to measure and re-construct an image in the present invention.

A few preferred methods can be used to measure and to re-construct the image after measurements. FIG. 6 shows a set of process steps 400 to measure and to re-construct the image. In this set of process steps, the detector in the first embodiment or the array of detectors in the third embodiment measures the image more than once, each time with the relative position between the detector(s) and the image changed. In another embodiment, the detector(s) just measures the image once, like in a snapshot. Such a snapshot measurement is especially suitable for lower resolution images.

Referring back to FIG. 6, to measure the image, the detector in the first embodiment or the array of detectors in the third embodiment is stepped, 404. The resolution of the steps depends on the desired resolution of the re-constructed image. The idea here is to measure the image more than once, each time with a change in the relative position between the image and the detector(s). Different methods may be used to change the relative position. For example, instead of stepping the array, one can move the image across a stationary array or one can move the housing of the array, such as a camera.

The concept of moving or stepping the housing of the array can be very useful. Imagine one is taking a picture of the image with the preferred array in the camera. As she takes the picture, her hands shake. While the hands are shaking, the array captures the image many times. From the relative positions of the different captures, one can approximately quantify the amount of shaking of the hands, which serves as the sizes of each step to re-construct the image.

The outputs from the measurements are stored, 406, after each measurement. When the time comes to re-construct the image, the measured outputs are retrieved 410 and deconvolved 414 by an inverted model of the non-uniform spatial sensitivity.

The inverted model is a function when convolved with the original non-inverted model gives a unity function. A unity function is a function with a value of 1 only at one place and with values of zero at every other places; it is similar to an impulse function with a magnitude of one.

Figure 7:
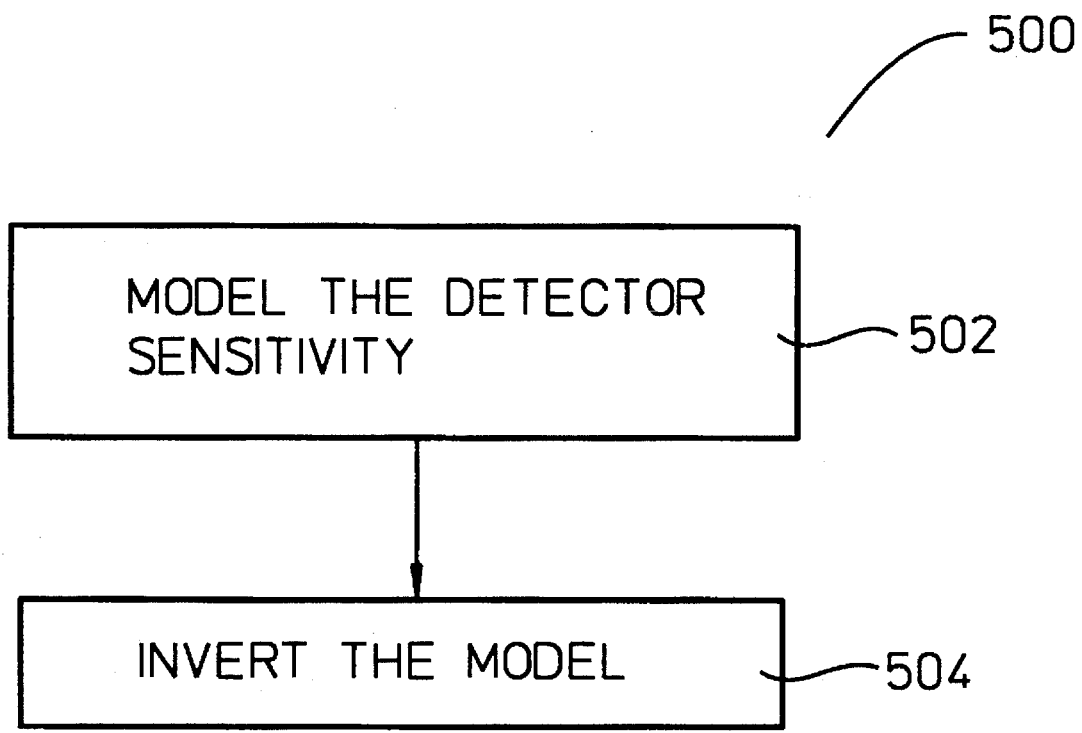
FIG. 7 shows a preferred method to generate an inverted model in the present invention.

The inverted model in the present invention is generated by the process steps 500 shown in FIG. 7. First the non-uniform spatial sensitivity of a detector is modelled, 502, and then the model is inverted, 504.

Figure 8A:
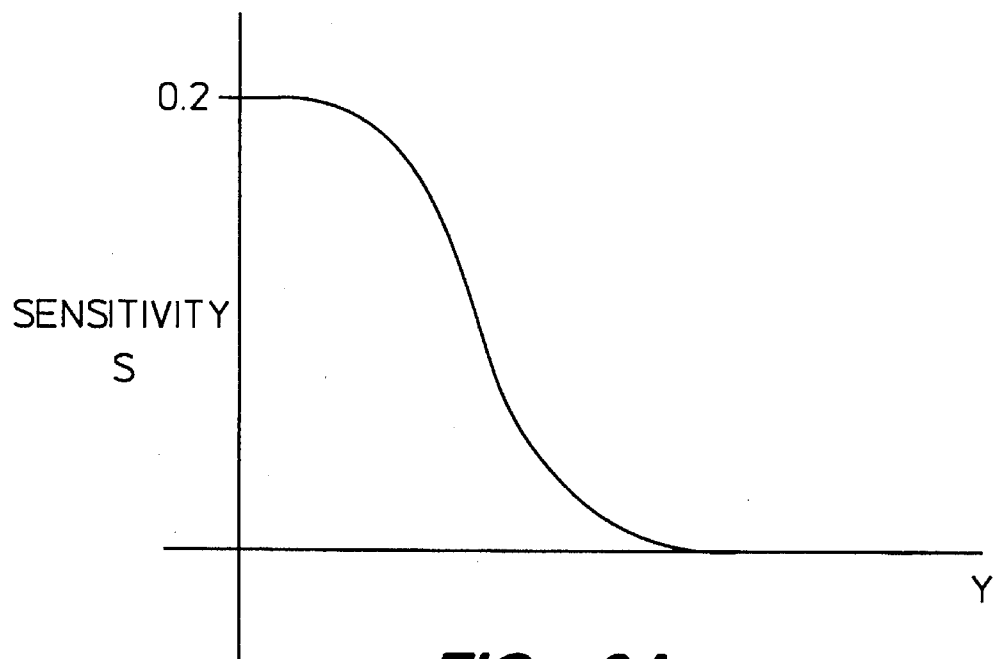
FIGS. 8A–B show one example of the process to generate an inverted model in the present invention.
Figure 8B:
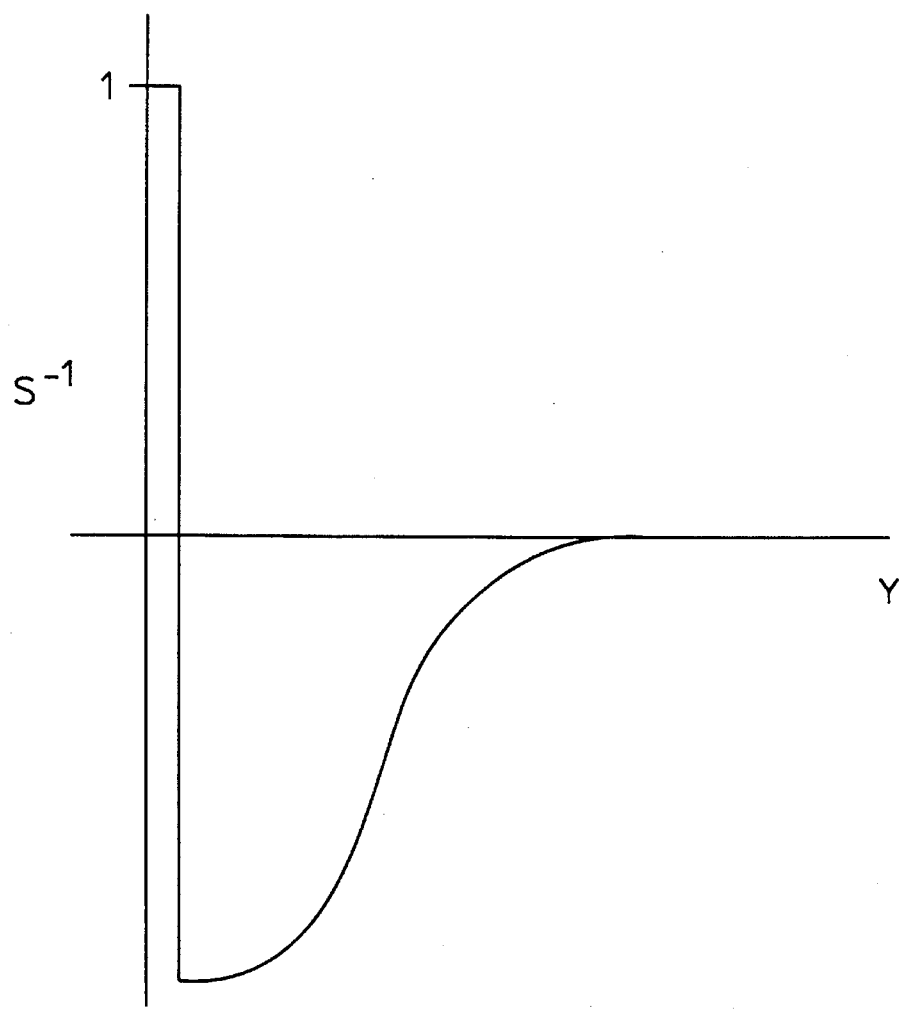

FIGS. 8A–B show a cross-section of a two dimensional example of the process to generate the inverted model. FIG. 8A shows a model of the sensitivity along the Y-axis. The sensitivity decreases from 1 (the maximum value) in a monotonic and continuous manner along the Y-axis to almost zero. The inverted model of the sensitivity is equal to 1 for Y equal to zero, and is equal to the negative of (the sensitivity/(the maximum value)) for other points along the Y axis. Such inverted model is discussed in "The Fourier Transform and Its Applications," written by Ronald N. Bracewell, second edition, revised, and will not be further described in this specification.

To re-construct the image, the measured outputs are deconvolved by the inverted model. A general equation for such a numerical deconvolution process can be found in page 429 of "The Fourier Transform and Its Applications," supra. In general, almost any deconvolution method may be used because the spatial non-uniformity in the detectors leads to a spatial frequency response with practically no cut-offs.

WORKING EXAMPLES

The invention will be further clarified by a consideration of the following examples, which are intended to be purely exemplary of using the invention.

Figure 9A:
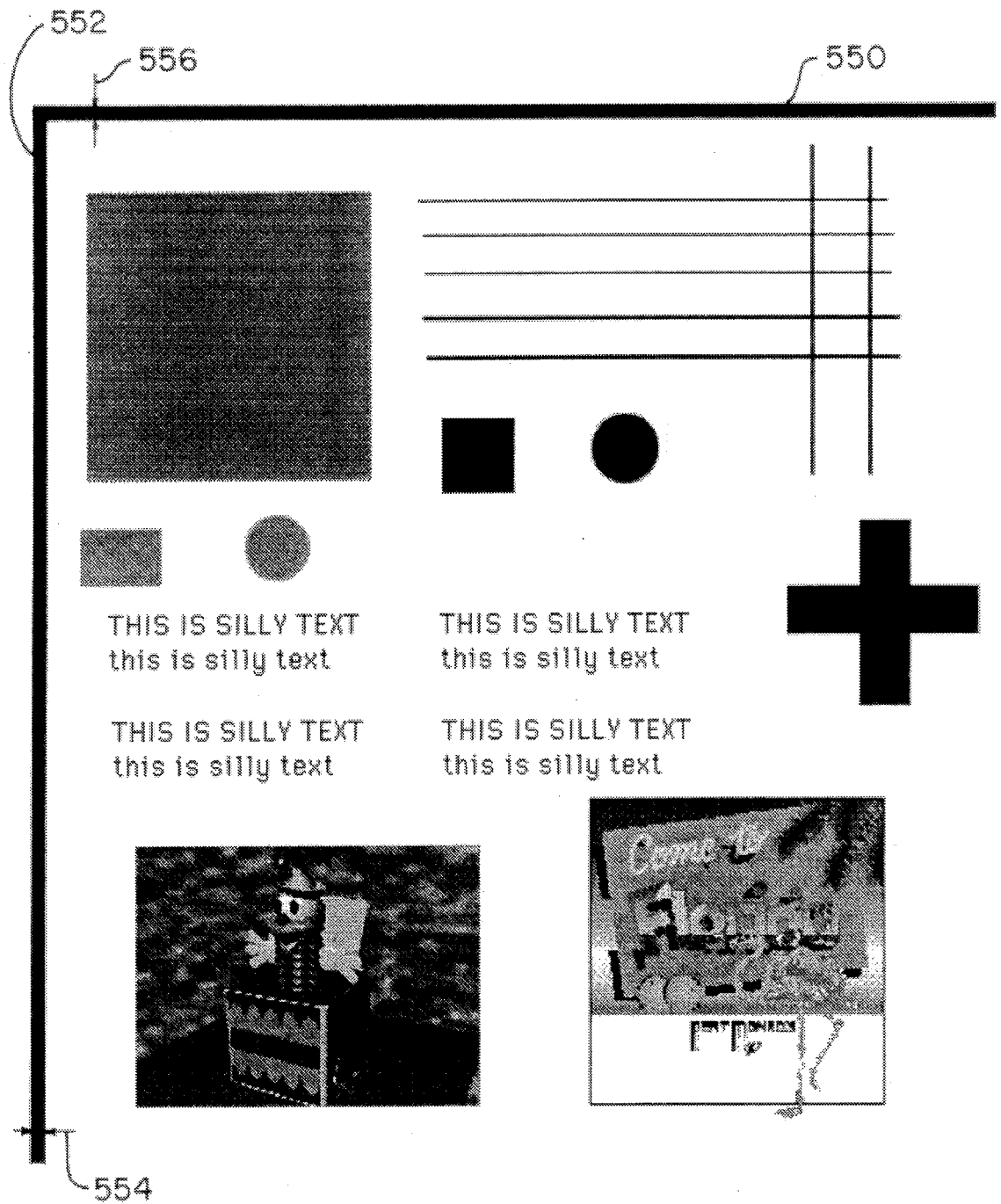
FIGS. 9A–C show an example of using the present invention to measure an image.
Figure 9B:
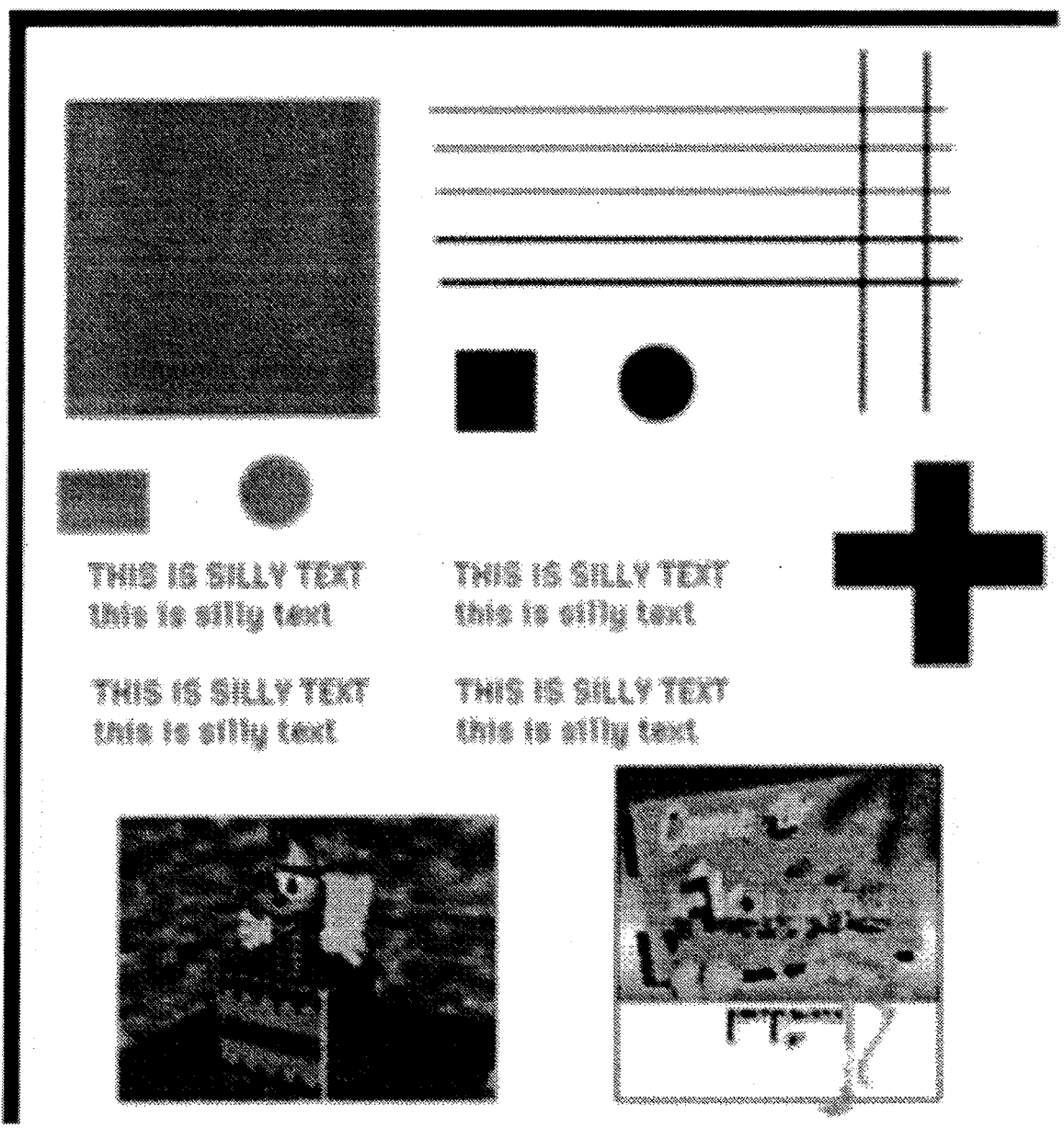
Figure 9C:
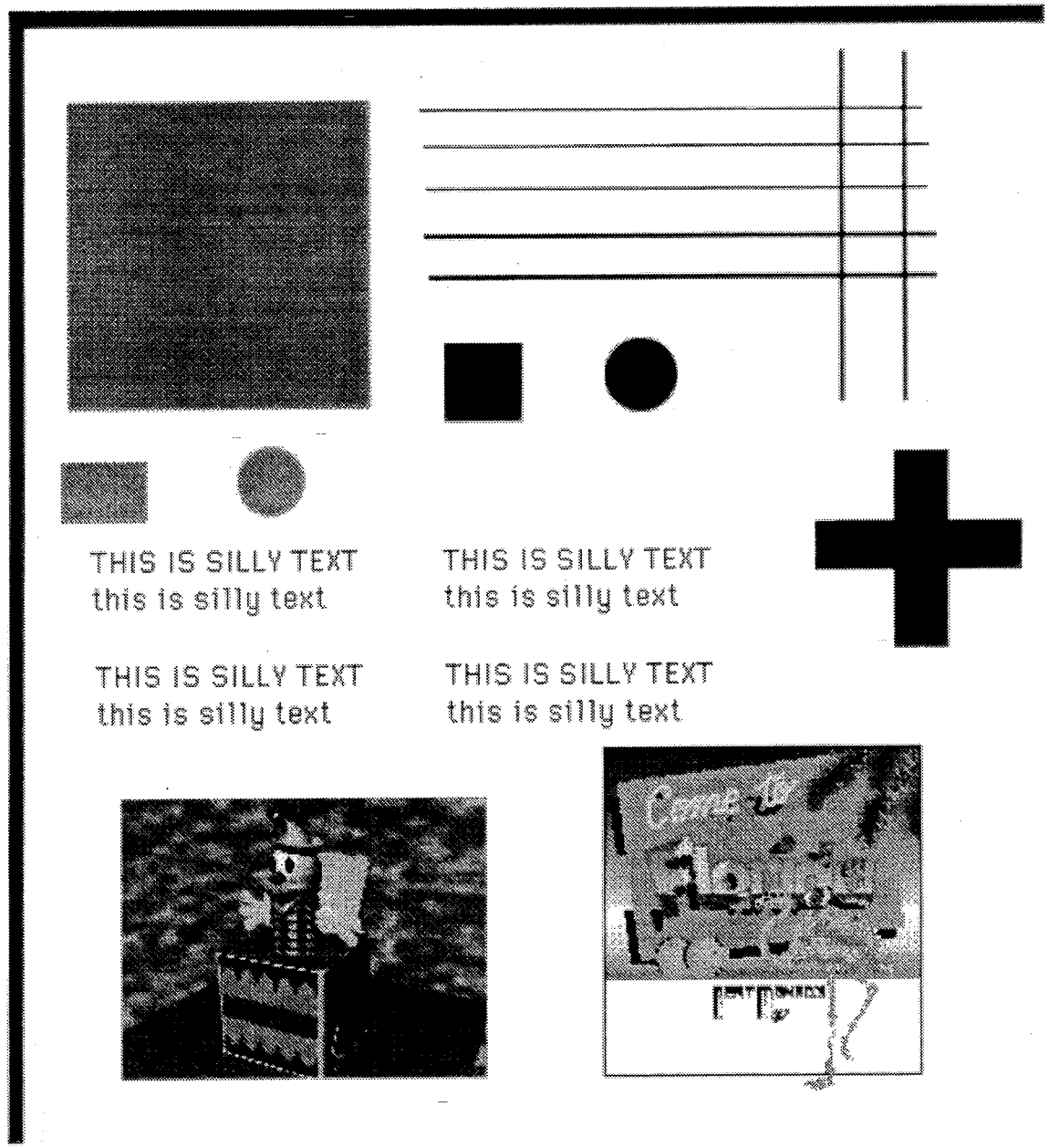

FIGS. 9A–C show an example of using a detector array in the present invention to measure an image. FIG. 6 shows the process steps to measure and re-construct the image.

FIG. 9A shows the original image, which is digitized at 200 pixels per inch. First, the resolution of the re-constructed image is decided, 402, to be n, which determines the step size of the array, with the number of steps taken to be r/n. If r/n is less than or equal to one, then the array will not be stepped. In the present case, the image in FIG. 9A is measured, 406, by the array at a step size of 0.005". With the array stepped to measure the image more than once, all the outputs measured are interlaced, 412, together. For example, the first set of measured outputs is $(c_1, c_3, \ldots)$ and the array is stepped to get a second set of measured outputs $(c_2, c_4, \ldots)$. The two sets of outputs are interlaced to get $(c_1, c_2, c_3, c_4 \ldots)$. The distance between positions of the neighboring outputs before interlacing is the dimension T of the period of the detector. The two sets of outputs are interlaced with a separation of one step size or n. FIG. 9B shows the measured outputs, which, in fact, are calculated analytically by convolving the model of the detector with the original image.

The image shown in FIG. 9A has two black bars, 550 and 552. These two bars serve to initialize the output values of the detector array. The widths, 554 and 556, of the two bars are approximately equal to r, the size of the detector. The two bars can be in the image or the two bars may be a frame covering the array.

The sensitivity of each detector in the detector array is modelled to be:

$$b(x,y) = Ae^{-\pi\sqrt{x^2+y^2}/D}$$

where:

x and y represent the x and y direction as in FIG. 2;

A represents the value of the highest sensitivity and A is equal to 1; and

D represents the width of 10 T.

The inverse of the sensitivity function can be described as follows:

$$b^{-1}(x,y) = 1 \text{ if } x = y = 0$$
$$= -b(-x,-y) \text{ for } x,y <> 0.$$

Each detector has a dimension r of 0.05". The period T of the detector array is 0.05".

To re-construct the image, the interlaced outputs are deconvolved, 414, by the inverse of the detector model. During deconvolution, the inverted model steps across the interlaced outputs. At every step, each value on the inverted model is multiplied to its corresponding value on the interlaced outputs; then all the multiplied outputs are added together. Such deconvolution steps are known to those skilled in the art and will not be further described. FIG. 9C shows the re-constructed image.

The present invention is not limited to a detector array with all the detectors being the same. Even if the detectors in the array are different, as long as they have the characteristics described in the present invention, and their characteristics are known, signal processing schemes can be used to re-construct the image.

From the foregoing it should be appreciated that one can use a non-uniform sensitivity profile of a detector, coupled with a signal processing scheme, to measure and re-construct a high resolution image, without resorting to expensive arrays of detectors and without significant loss in sensitivity.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim:

1. An apparatus for measuring an image with many parts, the apparatus comprising:

a one dimensional array of integrated circuit detectors, the detectors being spatially arranged with a pre-determined periodicity, each detector comprising:

a photosensitive surface, measuring, at any one time during the measurement, a part of the image to produce a measured output, the detector having a non-uniform spatial sensitivity across the surface;

the surface having at least one edge; and the sensitivity decreasing monotonically from the edge to an almost negligible sensitivity on a part of the surface;

such that:

at the end of the measurement, all parts of the image have been measured; and the image can be re-constructed by manipulating the measured outputs from the detectors with a signal processing scheme.

2. An apparatus as recited in claim 1 wherein each detector measures the image more than once, each time with the relative position between the image and the detector changed.

3. An apparatus as recited in claim 1 wherein for each detector:

the surface has at least two edges; and the sensitivity of the detector is substantially highest at the intersection of the two edges and decreases monotonically from its highest value to an almost negligible sensitivity on a part of the surface.

4. An apparatus as recited in claim 3 wherein the sensitivity decreases substantially without discontinuities.

5. An apparatus as recited in claim 4 wherein the sensitivity decreases in an exponential manner.

6. An apparatus as recited in claim 3 wherein the sensitivity decreases in a step manner.

7. An apparatus as recited in claim 1:

further comprising a plurality of detectors, each detector being similar to a detector in claim 1; and wherein the detectors are arranged in a grid to form a two dimensional array.

8. An apparatus as recited in claim 7, wherein the array measures the image more than once, each time with the relative position between the image and the array changed.

9. An apparatus as recited in claim 8 wherein the detectors are aligned such that the sensitivities of all the detectors are in similar orientations.

10. An apparatus as recited in claim 8 wherein for each detector:

the photosensitive surface has at least two edges; and the sensitivity of the detector is substantially highest at the intersection of the two edges and decreases monotonically from its highest value to an almost negligible sensitivity on a part of the surface.

11. An apparatus as recited in claim 10 wherein, for each detector, the sensitivity decreases substantially without discontinuities.

12. An apparatus as recited in claim 10 wherein, for each detector, the sensitivity decreases in a step manner.

13. An apparatus as recited in claim 8 wherein the array is an array of charge coupled devices.

14. An apparatus as recited in claim 8, wherein:

the apparatus includes a camera; and the relative position is changed by moving the camera across the image.

15. An apparatus as recited in claim 1 wherein each detector includes a mask on top of a sensor with a photosensitive surface having a spatially uniform sensitivity, the mask having an optical-transmittance profile substantially following the non-uniformity of the sensitivity of the detector.

16. An apparatus as recited in claim 2 wherein the signal processing scheme comprises the step of deconvolving the measured outputs by an inverted model of the non-uniform spatial sensitivity of one of the detectors to re-construct the image.

17. An apparatus as recited in claim 16 wherein the inverted model is generated by the steps of:

generating a model that represents the non-uniform spatial sensitivity of the detector; and inverting the model analytically.

18. An apparatus as recited in claim 8 wherein the signal processing scheme comprises the step of deconvolving the measured outputs by an inverted model of the non-uniform spatial sensitivity of one of the detectors to re-construct the image.

19. An apparatus as recited by claim 18 wherein the inverted model is generated by the steps of: generating a model that represents the non-uniform spatial sensitivity of one of the detectors; and inverting the model analytically.

* * * * *